United States Patent
Manchanda et al.

(10) Patent No.: US 12,462,211 B2
(45) Date of Patent: Nov. 4, 2025

(54) METHOD AND SYSTEM FOR DETERMINATION OF PERSONALITY TRAITS OF AGENTS IN A CONTACT CENTER

(71) Applicant: INFOSYS LIMITED, Bangalore (IN)

(72) Inventors: Vishal Manchanda, Bangalore (IN); Amit Kumar, Bangalore (IN); Venugopal Subbarao, Bangalore (IN); Janupalli Pranay, Bangalore (IN)

(73) Assignee: Infosys Limited, Bangalore (IN)

( * ) Notice: Subject to any disclaimer, the term of this patent is extended or adjusted under 35 U.S.C. 154(b) by 287 days.

(21) Appl. No.: 18/126,868

(22) Filed: Mar. 27, 2023

(65) Prior Publication Data
US 2024/0320595 A1    Sep. 26, 2024

(51) Int. Cl.
H04M 3/51 (2006.01)
G06F 40/40 (2020.01)
G06Q 10/0639 (2023.01)

(52) U.S. Cl.
CPC ........ G06Q 10/0639 (2013.01); G06F 40/40 (2020.01); H04M 3/51 (2013.01)

(58) Field of Classification Search
None
See application file for complete search history.

(56) References Cited

U.S. PATENT DOCUMENTS

| | | | |
|---|---|---|---|
| 2010/0020959 A1* | 1/2010 | Spottiswoode | H04M 3/5232 379/265.1 |
| 2018/0374000 A1* | 12/2018 | Herzig | G06N 3/006 |
| 2020/0193353 A1* | 6/2020 | Weisman | G06Q 10/06393 |
| 2021/0334472 A1* | 10/2021 | Shah | G06F 40/30 |

* cited by examiner

*Primary Examiner* — Nafiz E Hoque
(74) *Attorney, Agent, or Firm* — Finnegan, Henderson, Farabow, Garrett & Dunner, LLP

(57) ABSTRACT

This disclosure relates to method and system for determination of personality traits of agents in a contact center. The method includes retrieving textual data corresponding to a conversation between a first agent and a first customer. The method further includes generating a natural language justification corresponding to a set of personality traits of the first agent based on the textual data through a first Machine Learning (ML) model. The natural language justification may include one or more sentences. The one or more sentences may include a mapping of the textual data with the set of personality traits and a qualitative label associated with each of the set of personality traits. The method further includes determining a value corresponding to each of the set of personality traits of the first agent through the first ML model based on the natural language justification and the associated qualitative label.

17 Claims, 10 Drawing Sheets

```
┌─────────────────────────────────────────────┐
│ Transcript 1001                             │
│ ┌─────────────────────────────────────────┐ │
│ │                                         │ │
│ └─────────────────────────────────────────┘ │
│                                             │
│ Max_length 1002                             │
│ ┌─────────────────────────────────────────┐ │
│ │                                         │ │
│ └─────────────────────────────────────────┘ │
│                                             │
│ ┌────────┐                                  │
│ │ Submit │                                  │
│ └────────┘                                  │
│ ┌─────────────────────────────────────────┐ │
│ │            Analysis 1003                │ │
│ │ Predicted labels 1004                   │ │
│ │ ┌─────────────────────────────────────┐ │ │
│ │ │                                     │ │ │
│ │ └─────────────────────────────────────┘ │ │
│ │ Reasoning 1005                          │ │
│ │ ┌─────────────────────────────────────┐ │ │
│ │ │                                     │ │ │
│ │ └─────────────────────────────────────┘ │ │
│ └─────────────────────────────────────────┘ │
└─────────────────────────────────────────────┘
```
↗ 1000

FIG. 10

METHOD AND SYSTEM FOR DETERMINATION OF PERSONALITY TRAITS OF AGENTS IN A CONTACT CENTER

CROSS-REFERENCE TO RELATED APPLICATION

This application claims priority to Indian Patent Application No. 202341021187, filed on Mar. 24, 2023, which is hereby incorporated by reference in its entirety.

TECHNICAL FIELD

This disclosure relates generally to personality assessment, and more particularly to a method and a system for determining personalities of agents, in a contact center, through natural language processing.

BACKGROUND

Globally, enterprises, both big or small, invest heavily every year in their customer support teams indicating the importance of customer satisfaction as a key to successful business models. Businesses train their resources to prioritise the customers and values such as, empathy, friendliness, politeness, domain expertise, and critical thinking are inculcated in the employees right from the start. Such values are highly sought after personality traits in customer support agents. Hence, identification of personality type of an agent is important.

In the present state of art, some techniques employ the use of Artificial Intelligence (AI) to analyze and predict personalities. Such models aim to correlate various data (such as, agent-customer conversation transcripts, customer feedback, etc.) with agent personality traits. Such models are trained to recognize patterns in data and then make predictions based on those patterns.

However, existing systems are prone to error and misjudgements. This has been observed in the use of AI algorithms for screening job candidates and credit card/bank loan applicants. Such systems usually have a bias, depriving the candidates of a fair chance. Prediction of personality of a person is not an ordinary classification problem. Personality is generally more nuanced and, unless given a proper context, is highly likely to be misjudged.

Further, in telecom domain, for example, analyzing the conversation between an agent and a customer by classifying the traits using conventional AI algorithms (i.e., using AI as a magic black box), may not always work. Classical or traditional approaches for automating agent personality prediction struggle with providing multi-step reasonings involved to identify multiple intermediate series of justifications to conclude the best agent personality. While AI is a helpful tool, for something as critical as analyzing personalities, there is always a doubt of bias and unanswered questions as to how the AI came to the conclusion. There is, therefore, a need in the present state of art, for techniques to address the problem of unreliable agent personality prediction by classifying the traits by providing a reasoning and justification for each trait.

SUMMARY

In one embodiment, a method for determination of personality traits of agents in a contact center is disclosed. In one example, the method may include retrieving textual data corresponding to a conversation between a first agent and a first customer. The textual data may include a transcript of the conversation. Further, the method generating a natural language justification corresponding to a set of personality traits of the first agent based on the textual data through a first Machine Learning (ML) model. The natural language justification may include one or more sentences. The one or more sentences may include a mapping of the textual data with the set of personality traits and a qualitative label associated with each of the set of personality traits. Further, the method may include determining a value corresponding to each of the set of personality traits of the first agent through the first ML model based on the natural language justification and the associated qualitative label.

In one embodiment, a system for determination of personality traits of agents in a contact center is disclosed. In one example, the system may include a processor and a computer-readable medium communicatively coupled to the processor. The computer-readable medium may store processor-executable instructions, which, on execution, may cause the processor to retrieve textual data corresponding to a conversation between a first agent and a first customer. The textual data may include a transcript of the conversation. The processor-executable instructions, on execution, may further cause the processor to generate a natural language justification corresponding to a set of personality traits of the first agent based on the textual data through a first ML model. The natural language justification may include one or more sentences. The one or more sentences may include a mapping of the textual data with the set of personality traits and a qualitative label associated with each of the set of personality traits. The processor-executable instructions, on execution, may further cause the processor to determine a value corresponding to each of the set of personality traits of the first agent through the first ML model based on the natural language justification and the associated qualitative label.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 10 is a block diagram of a Graphical User Interface (GUI) for determination of personality traits of agents in a contact center, in accordance with an exemplary embodiment of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
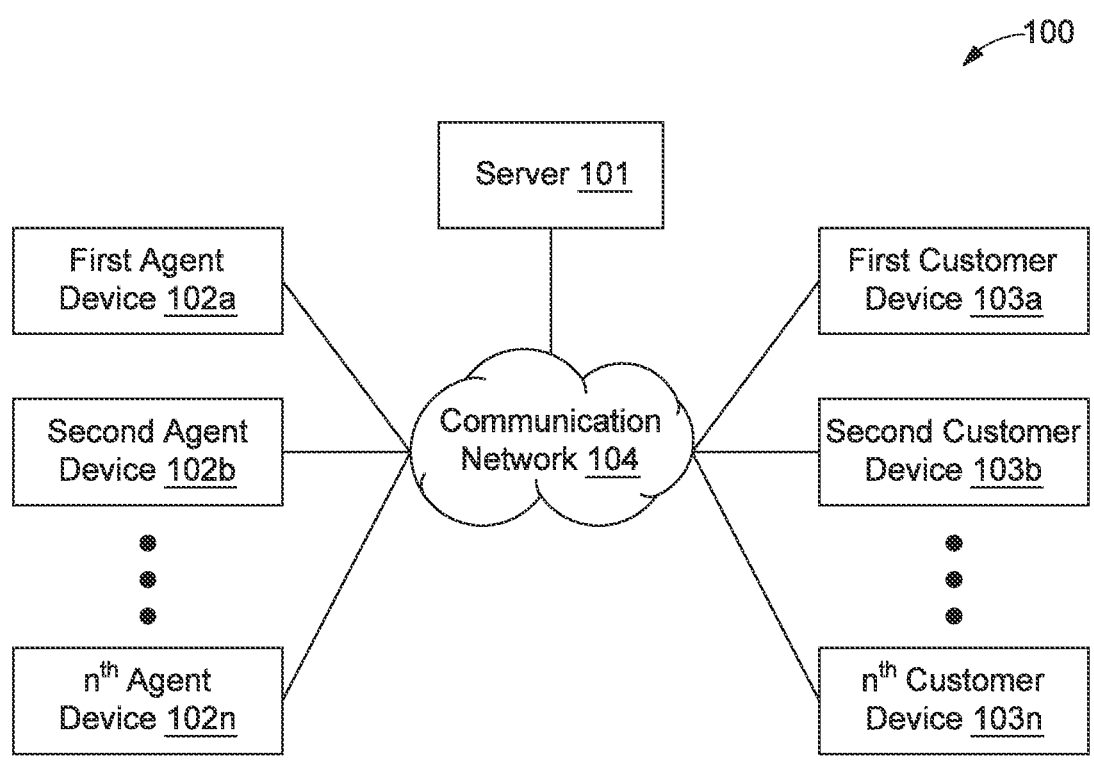
FIG. 1 is a block diagram of an environment for determination of personality traits of agents in a contact center, in accordance with an exemplary embodiment of the present disclosure.

FIG. 1 is a diagram that illustrates an environment 100 for determination of personality traits of agents in a contact center, in accordance with an exemplary embodiment of the present disclosure.

The environment 100 may include a server 101, a plurality of agent devices (e.g., a first agent device 102a, a second agent device 102b, . . . , an $n^{th}$ agent device 102n) associated with a plurality of agents, and a plurality of customer devices (e.g., a first customer device 103a, a second customer device 103b, . . . , an $n^{th}$ customer device 103n) associated with a plurality of customers. The server 101, the plurality of agent devices, and the plurality of customer devices are configured to communicate with each other via a communication network 104. Examples of the communication network 104 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The communication network 104 may facilitate conversations between the plurality of agents in a contact center and the plurality of customers. The conversations may be in a form including, but not limited to, telephonic calls, Voice over Internet Protocol (VOIP) communication, video calls, e-mails, text messaging, WebRTC communication, or any other real-time or non-real time media communication. The VoIP communication may be controlled by a signaling protocol over the Internet, such as, Session Initiation Protocol (SIP), H.323, or the like.

Generally, the contact center of an enterprise (i.e., a business, an organization, or any other entity that offers products or services) is a point of contact between the enterprise and any person or entity that wants to interact with the enterprise. The contact center may be an inbound contact center, an outbound contact center, or a combination thereof. As will be appreciated, the inbound contact center may receive a communication (in form of telephonic calls, VOIP communication, video calls, e-mails, text messaging, WebRTC communication, or any other real-time or non-real time media communication) from a target contact (operating through an external device). The inbound contact center may aim to improve contact satisfaction by providing support or assistance to the target contact. Likewise, the outbound contact center may send the communication from the contact center to the target contact (operating through an external device). The outbound contact center may aim at improving sales, conducting market research, obtaining feedback, etc. A combination contact center may include aspects of both the inbound contact center and the outbound contact center in varying proportions.

The enterprise may have one or more contact centers at various geographical locations based on requirements. In an embodiment, the contact center may be an on-site workplace. In another embodiment, the contact center may be remotely operated (for example through cloud).

An agent may be a resource associated with the enterprise either directly or through a third-party enterprise. The agent may be delegated a set of predefined responsibilities when interacting through the contact center. For example, one of the set of predefined responsibilities of the agent may include handling incoming and outgoing conversations from the contact center. By way of an example, the agent may be a support agent, a subject matter expert, a sales agent, a market research agent, or the like. In a conventional contact center, the agent may be physically present at the contact center or in proximity to the contact center in order to execute the set of predefined responsibilities. However, when the contact center is remotely operated, the agent may be located away from the contact center when executing the set of predefined responsibilities.

The agent may operate an agent device (such as the first agent device 102a). In some embodiments, the agent may operate more than one agent devices. The agent device may be a telecommunication device or any computing device capable of exchanging information over a communication network (such as the communication network 104). The agent device may be communicatively coupled (through a wired or a wireless connection) with the server 101 through the communication network 104. By way of an example, the agent device may be a telephone, a cellular phone, a smartphone, a tablet, a laptop, a desktop, or the like.

A customer (i.e., any person, end user, a group, or entities) may communicate with the enterprise through the contact center. It should be noted that the term "customer" as defined herein, may refer to both an existing customer as well as a prospective customer. In some embodiments, the customer may want to interact with the enterprise for various reasons such as, seeking assistance related to products or services offered by the enterprise, enquiring about various details related to the products or services, providing feedback on the products or services, or the like. In some embodiments, the enterprise may want to interact with the customer for reasons such as, making a sales pitch for products or services offered by the enterprise, conducting market research, seeking customer feedback on the products or services, offering assistance with respect to the products or services, or the like. It should be noted that, agent associated with the enterprise may be interacting on behalf of the enterprise through an associated agent device.

The customer may interact with the contact center through a customer device (such as the first customer device 103a). When the customer is interacting with an agent, the customer device is communicatively coupled with the agent device via the communication network 104. The customer device may be a telecommunication device or any computing device capable of exchanging information over a communication network (such as the communication network 104). By way of an example, the customer device may be a telephone, a cellular phone, a smartphone, a tablet, a laptop, a desktop, or the like.

The contact center may be operated by the server 101. The server 101 may be a centralized server or a group of decentralized servers. The server 101 may receive data corresponding to the conversations (e.g., voice call, video call, text chat, e-mail, etc.) between agents and customers. The data may be in form of audio data (e.g., call recordings of the conversations), video data (e.g., video recordings of the conversations), or textual data (e.g., transcripts of the conversations). Further, the server 101 may store the data in a database. In some embodiments, if the data is in a form of audio data, the server 101 may retrieve the stored data from the database and transform the audio data into textual data using a speech-to-text algorithm. The generated textual data may then be stored in the database. If the data is in a form of video data, the server 101 may extract audio data from the video data and then transform the extracted audio data into textual data using a speech-to-text algorithm. The generated textual data may then be stored in the database. It should be noted that the textual data may be in a form of a transcript of the conversation. In an embodiment, the server 101 may generate the textual data (i.e., the transcript) corresponding to a conversation in real-time.

Further, the server 101 may retrieve the textual data from the database and may determine a set of personality traits of an agent through natural language justification using a Machine Learning (ML) model. By way of an example, the set of personality traits may include at least one of emotional stability, critical thinking, empathy, communication skills, knowledge retention, organization, speed and accuracy, team player skill, and adaptability. The natural language justification may be generated for the set of personality traits of an agent to provide reasonings corresponding to the determined values of the set of personality traits of the agent. The ML model may generate the natural language justification. It should be noted that the terms "justification" and "reasoning" have been used interchangeably in the present disclosure. The natural language justification may include one or more sentences. The one or more sentences may include a mapping of the textual data with the set of personality traits and a qualitative label associated with each of the set of personality traits. For example, the natural language justification corresponding to a personality trait "empathy" of an agent for a conversation may be generated as "In this conversation, by saying "Hi Watson. I understand your concern.", the agent shows empathy by acknowledging the customer's issue and expressing understanding". Here, a part of the textual data, "Hi Watson. I understand your concern." is mapped with a personality trait "empathy" along with a qualitative label (i.e., an affirmative sentence implying that the agent shows empathy).

Based on the natural language justification, a label (e.g., "yes" or "no") or a value (e.g., binary value ('0' or '1'), or a real numerical value ('0.56', '½', '96%', etc.)) may be determined for each of the set of personality traits. By way of an example, the ML model may be an advanced Natural Language Process (NLP) algorithm (such as, a sequence of justification and reasoning model, an Artificial Intelligence (AI)-based Large Language Model (LLM) or any NLP-based model that is capable of generating reasoning). Further, the server 101 may store the determined value for each of the set of personality traits of an agent. It should be noted that the server 101 may perform the aforementioned functions for each of the plurality of agents in the enterprise. Thus, the database may include personality data (including natural language justifications and the determined value for past conversations) of each of the plurality of agents.

Further, based on the determined personality traits, the server 101 may route incoming customer communications (e.g., voice calls, video calls, text messages, or e-mails) to agents based on the determined personality traits using the ML model. Routing of an incoming customer communication may be performed by mapping of an agent with the customer based on the set of personality traits of the agent. In some embodiments, a set of personality traits of the customer may also be determined and mapped with the set of personality traits of the agent. Also, the server 101 may identify strengths and weaknesses of the agents based on the determined personality traits. The identified strengths and weaknesses may then be used to determine training strategies specific for each agent. The identified strengths and weaknesses may also be used to monitor progress of the agent and to conduct a performance evaluation of the agent (for e.g., annually) to determine whether the agent is eligible for a promotion or a salary hike.

By way of an example, a first customer associated with the first customer device 103a may initiate a conversation through a voice call with the enterprise by contacting the contact center. The customer may want to resolve an issue with a product offered by the enterprise. Further, the server 101 may receive an incoming call request from the first customer device 103a. The contact center of the enterprise may initially respond through an Interactive Voice Response (IVR) system (not shown in figure). In an embodiment, the server 101 may monitor customer responses to options provided by the IVR system. Upon navigating through the options and when the IVR system fails to resolve the issue, the customer may confirm an intent to contact an agent.

Further, the server 101 may receive the request through the IVR system. The server 101 may then select the agent associated with the first agent device 102a to interact with the customer based on the personality data of the agent. For example, for a highly technical issue, the agent should possess a good level of technical knowledge that may be reflected in the personality traits "critical thinking" and "knowledge retention". Thus, an agent with a higher value determined for "critical thinking" and "knowledge retention" may be preferred over an agent with a lower value for such personality traits.

To facilitate the interaction between the agent and the customer, the server 101 may route the first customer device 103a with the first agent device 102a. Further, the server 101 may record the conversation between the agent and the customer from the first agent device 102a. Further, when the conversation is complete, the server 101 may receive a recording of the conversation in form of audio data. In some embodiments, the server 101 may store the audio data in a database. The server 101 may then generate textual data (i.e., a transcript of the conversation) from the audio data using a speech-to-text algorithm.

Further, the server 101 may retrieve the textual data from the database and may generate a natural language justification corresponding to the set of personality traits of the agent based on the textual data through the ML model. Further, the server 101 may determine a value corresponding to each of the set of personality traits of the agent through the ML model based on the natural language justification. It should be noted that the natural language justification may be generated, and the value may be determined for each conversation of the agent. However, each newly determined value may be averaged with a previously determined value to generate an updated value after each conversation. In some embodiments, the updated value may be an average of the determined value from each of a plurality of conversations. In an embodiment, the updated value may be a weighted average of the determined value from each of the plurality of conversations. Weights for the weighted average may be pre-defined (for example more recent conversations would be allotted a higher weightage than older conversations).

Figure 2:
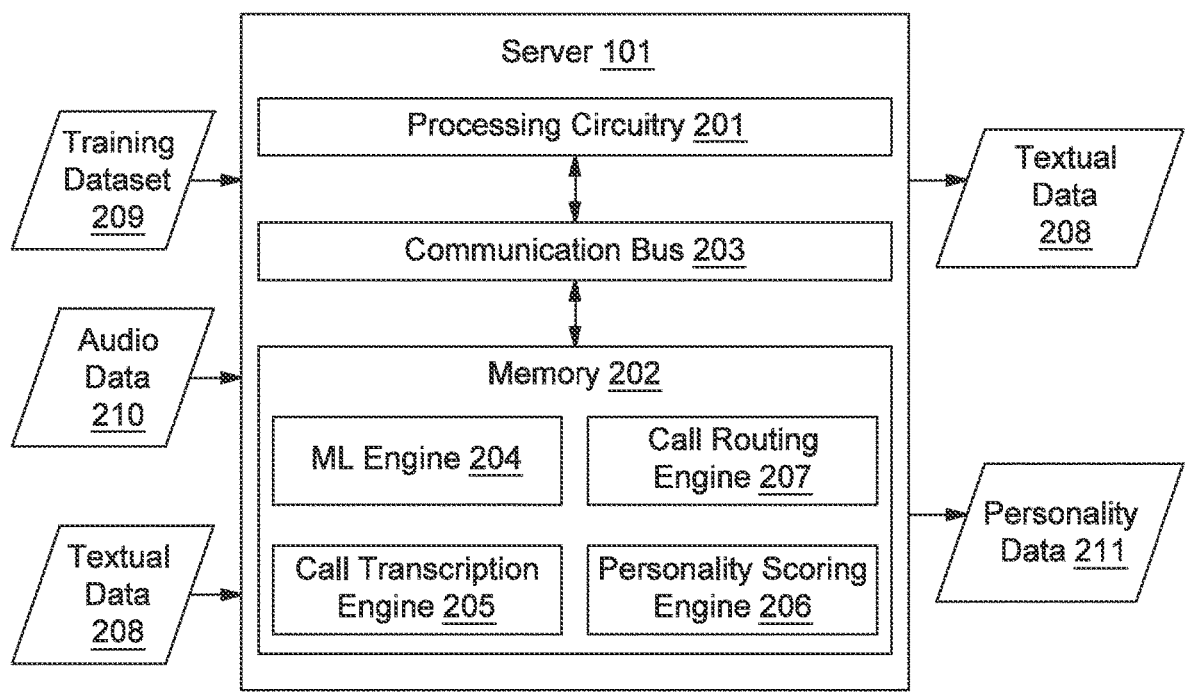
FIG. 2 is a block diagram of a process for determination of personality traits of agents, in accordance with an exemplary embodiment of the present disclosure.

FIG. 2 is a diagram that illustrates a process for determination of personality traits of agents, in accordance with an exemplary embodiment of the present disclosure. FIG. 2 is explained in conjunction with elements from FIG. 1. The server 101 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure such as, but not limited to, determination of personality traits of an agent, routing a customer call to a selected agent, and transcription of a conversation between an agent and a customer. The memory 202 may include an ML engine 204, a call transcription engine 205, a personality scoring engine 206, and a call routing engine 207.

The ML engine 204 may retrieve textual data corresponding to a conversation between an agent and a customer from a database (e.g., an internal database or a third-party database) through the processing circuitry 201. It should be noted that the textual data may correspond to a plurality of conversations and may not be limited to a single conversation. For ease of explanation, the process is explained for a single conversation. However, each of the modules 204-207 of the server 101 may perform similar steps for other conversations as well. It is worth noting that the process is described in detail after explanation of an embodiment of the server using the textual data corresponding to a single conversation. Hereinafter, the term the term "textual data" is designated and referred to as "textual data 208".

Further, the ML engine 204 may include a first ML model that may be trained using a training dataset 209. By way of an example, the first ML model may be an advanced NLP algorithm (such as, a sequence of justification and reasoning model, an AI-based LLM, or any NLP-based model that can generate natural language justification). The training dataset 209 may include training textual data and corresponding ground truth data. The training textual data may include transcripts of historical conversations stored in the database. Alternately, the training textual data may be obtained from an external database.

Each element of the ground truth data includes a ground truth value (i.e., a correct value) and an associated ground truth reasoning (i.e., a correct natural language justification) for each of the set of personality traits. For example, the training dataset 209 may include a transcript for a conversation along with a pre-defined natural language justification for the set of personality traits of an agent involved in the conversation. The pre-defined natural language justification should be correct or at least in alignment with enterprise requirements. Similarly, the training dataset 209 may include a pre-determined (and correctly determined as per the enterprise requirements) value corresponding to each of the set of personality traits. Using the ground truth value and the associated ground truth reasoning, the first ML model may be trained to generate natural language justifications and values corresponding to the set of personality traits of an agent in accordance with the enterprise requirements.

The ML engine 204 may provide the training textual data from the training dataset 209 as an input to the first ML model. Further, the ML engine 204 may receive a value corresponding to each of the set of personality traits and a natural language justification associated with the value, as an output from the first ML model. Further, the ML engine 204 may determine a binary cross entropy loss between the received value and the corresponding ground truth value. The binary cross entropy loss is a loss function that may be used to determine an error between received value and the corresponding ground truth value. It should be noted that the binary cross entropy loss is used for binary classification ML models. Therefore, in a preferred embodiment when the first ML model is a binary classification model (i.e., the received value is either '0' or '1'), then the binary cross entropy loss may be the preferred loss function. However, in some embodiments, the first ML model may not be a binary classification ML model (for example the received value may be in form of a score or a percentage value). In such embodiments, a different loss function may be used.

Further, the ML engine 204 may determine a text similarity score between the received natural language justification and the ground truth reasoning using a sentence encoder. The sentence encoder may encode text of the received natural language justification and the ground truth reasoning into high-dimensional vectors. The high-dimensional vectors may then be compared with each other to determine the text similarity score.

Further, the ML engine 204 may perform backpropagation using a weighted loss of the binary cross entropy loss and the text similarity score. Backpropagation may test for errors in the received values moving back from output nodes to input nodes. In other words, backpropagation update weights of the first ML model based on an error rate obtained in a previous iteration of the first ML model.

Further, the ML engine 204 may calculate an accuracy score (such as an F1 score) between the received value and the ground truth value for the first ML model. Further, the ML engine 204 may modify one or more parameters (e.g., weights) of the first ML model based on the accuracy score, the text similarity score, and the backpropagation.

In addition to training the first ML model with the training dataset 209, the ML engine 204 includes a second ML model to facilitate tuning of the first ML model by performing reinforcement learning. Tuning includes modification of the one or more parameters of the first ML model based on rewards assigned by the second ML model to outputs of the first ML model. The first ML model may generate a set of natural language justifications corresponding to the textual data 208 or the training textual data of the training dataset 209. The second ML model may then assign a rank to each of the set of natural language justifications. Further, the second ML model may determine a score for each of the set of natural language justifications based on the rank, to select the natural language justification from the set of natural language justifications. The score may be determined through a reinforcement learning algorithm. Based on the score and the assigned rank, one or more parameters of the first ML model may be modified to improve the generation of the natural language justification.

Additionally, the ML engine 204 may tune the second ML model to determine the score for each of the set of natural language justifications generated by the first ML model. To tune the second ML model, the ML engine 204 may assign a rank to each of the set of natural language justifications. Further, the ML engine 204 may modify one or more parameters (e.g., weights) of the second ML model based on the assigned rank. In some embodiments, the ML engine 204 may be determine a reward using a reward mechanism (such as a reinforcement learning algorithm). The reward mechanism may reward higher-ranked natural language justifications more than lower-ranked natural language justifications. In some other embodiments, the reward mechanism may penalize the lower-ranked natural language justifications more than the higher-ranked natural language justifications.

It should be noted that in an embodiment, the first ML model and the second ML model may be pre-trained. In such an embodiment, training of the ML model as explained above may not be required. In some embodiments, the second ML model may perform tuning of the first ML model in real-time.

In some embodiments where the conversation is based on a text-only medium (e.g., chat, social media posts, blog comments, or e-mail), the textual data 208 of the conversation may be readily available or may be required to undergo one or more data preprocessing steps. However, in such cases, transcription through a speech-to-text conversion algorithm may not be required. In some embodiments where the conversation is not based on a text-only medium, the textual data 208 may be obtained from an audio recording (i.e., audio data 210) of the conversation through a speech-to-text conversion algorithm. The call transcription engine 205 may receive the audio data 210 of the conversation from an agent device (such as the first agent device 102a, the second agent device 102b, . . . , or the nth agent device 102n). Further, the call transcription engine 205 may generate the textual data 208 from the audio data 210 of the conversation through a speech-to-text algorithm. The textual data 208 may then be stored in the database.

In some embodiments, the server 101 may store the textual data 208 corresponding to a plurality of conversations for a plurality of agents. In such embodiments, the textual data may be obtained from audio data 210, through text-only platforms, or through a combination thereof.

Further, the first ML model of the ML engine 204 may generate a natural language justification corresponding to a set of personality traits of the agent based on the textual data 208. By way of an example, the set of personality traits may include, but may not be limited to, at least one of emotional stability, critical thinking, empathy, communication skills, knowledge retention, organization, speed and accuracy score, team player score, and adaptability. The natural language justification may include a reasoning (in form of an analysis of personality of the agent) based on the textual data 208. The natural language justification may include one or more sentences. The one or more sentences may include a mapping of the textual data with the set of personality traits and a qualitative label associated with each of the set of personality traits. For example, the natural language justification corresponding to a personality trait "empathy" of an agent for a conversation may be generated as "In this conversation, by saying "Hi Watson. I understand your concern.", the agent shows empathy by acknowledging the customer's issue and expressing understanding". Here, a part of the textual data, "Hi Watson. I understand your concern." is mapped with a personality trait "empathy" along with a qualitative label (i.e., an affirmative sentence implying that the agent shows empathy). In an embodiment, the generated natural language justification may be stored in the database.

In a first exemplary scenario, for a single agent (for example a first agent), the first ML model may generate a first natural language justification corresponding to a set of personality traits of the first agent based on the textual data of a conversation between the first agent and a first customer.

In a second exemplary scenario, for the first agent interacting with a second customer, the first ML model may generate a second natural language justification corresponding to a set of personality traits of the first agent based on the textual data of a conversation between the first agent and the second customer.

In a third exemplary scenario, for an agent other than the first agent (for example a second agent), the first ML model may generate a third natural language justification corresponding to a set of personality traits of the second agent based on the textual data of a conversation between the second agent and the third customer.

Similarly, the first ML model may generate natural language justifications corresponding to a set of personality traits of a plurality of agents for a plurality of conversations. The generated natural language justifications may then be stored in the database or may be used by the personality scoring engine 206.

Further, based on the natural language justification and the associated qualitative label generated by the first ML model, the personality scoring engine 206 may determine a value corresponding to each of the set of personality traits of the agent through the first ML model. The value may be in form of Boolean data types (i.e., selected from one of two possible values (e.g., "true" and "false", or "0" and "1")). Alternately, in some embodiments, the value may be in form of percentage scores (for example, any number between 0 and 1, or between 0 and 100).

In continuation of the first and second exemplary scenarios, for the first agent, the personality scoring engine 206 may compute a weighted average value of the value and a subsequently determined value for each of the set of personality traits through the first ML model. The subsequently determined value is based on textual data of one of: (a) a conversation between the first agent and a second customer, or (b) a subsequent conversation between the first agent and the first customer. Further, the personality scoring engine 206 may generate an updated value (i.e., the weighted average value) for each of the set of personality traits.

In continuation of the third exemplary scenario, the personality scoring engine 206 may determine a value corresponding to each of the set of personality traits of the second agent through the first ML model based on the natural language justification and the associated qualitative label.

Similarly, the personality scoring engine 206 may determine a value corresponding to the set of personality traits of a plurality of agents for a plurality of conversations. The value corresponding to the set of personality traits of the plurality of agents may then be stored in the database.

Further, the server 101 may output personality data 211 including the determined value for each of the set of personality traits of an agent. In an embodiment, the personality data 211 is provided in form of a table including the set of personality traits and the corresponding values. In some other embodiments, the personality data 211 may be provided in a conversational text form (for example, through an LLM). Additionally, the server 101 may or may not output the personality data 211 along with a confidence level for the determined values. The confidence level may further allow users to estimate reliability of the determined values along with the natural language justification.

Further, the server 101 may render a Graphical User Interface (GUI) on a display of a user device. Further, the server 101 may present the generated natural language justification and the determined value corresponding to each of the set of personality traits on the GUI. If confidence levels are output in the personality data 211, then the confidence levels may also be presented as a separate section in the GUI.

In some embodiments, the call routing engine 207 may use the output personality data 211 to select an agent from a plurality of agents for a customer based on the determined values (i.e., intelligent routing). By way of an example, the ML engine 204 may retrieve the textual data corresponding to a conversation between a first agent (operating the first agent device 102a) and a first customer. Further, the ML engine 204 may retrieve the textual data corresponding to a conversation between a second agent (operating the second agent device 102b) and a second customer. Further, the first ML model may generate a natural language justification corresponding to a set of personality traits of the first agent and the second agent based on the textual data. Further, the personality scoring engine 206 may determine a value corresponding to each of the set of personality traits of the second agent through the first ML model based on the natural language justification. Further, the call routing engine 207 may compare the determined value corresponding to each of the set of personality traits of the first agent with the corresponding determined value of the second agent. Further, the call routing engine 207 may select one of the first agent or the second agent to interact with a current customer based on the comparison. It should be noted that the above example is explained with two agents but the same logic may apply for intelligent routing even when there are more than two agents. The call routing engine 207 may select an agent from a plurality of agents based on a comparison of the determined value of each of the set of personality traits among the plurality of agents.

Based on the personality data 211, the call routing engine 207 may assign a label (e.g., "customer's delight", "problem solver", etc.) to each of the plurality of agents. Alternately, each of the plurality of agents may be assigned a personality type (such as, a Myers and Briggs personality type (e.g., ENTJ, INFP, etc.) or any other established personality type categorization) based on the personality data 211 that may be used in the intelligent routing. As will be appreciated by those skilled in the art, in customer care domain, there is a need for finding the best agent for a given issue coming from a customer so that the customer issue gets resolved accurately and faster. In most contact centers, the process of routing the agent is manual, time consuming, and inaccurate due to time constraints, inadequate checks, lack of automation, etc. Here, if the personality data 211 of the agent is matched with a customer profile above a predefined threshold confidence level, the server 101 may automatically route the customer to the agent. If the personality data 211 of the agent is matched with a customer profile below a predefined threshold confidence level, the server 101 may direct a supervisor to review the determined values and the generated natural language justification to manually route the agent upon validation.

In such embodiments, the personality data 211 of the agent may be matched with a personality data of the customer (for example, in form of customer profile) to optimally select the agent for the customer. The customer profile may be generated based on available customer data (such as, personal data, historical data corresponding to the customer's association with enterprise, i.e., a digital footprint of the customer (e.g., browsing history or other digital data), data obtained from third party data sources, etc.). One or more customer parameters may be computed based on the customer data. By way of an example, the one or more customer parameters may include, but may not be limited to, customer loyalty, customer criticality, customer temperament, past behaviour, and the like.

Further, in some embodiments, the output personality data 211 may be used to analyze performance of the agents based on a set of performance metrics. The better performing agents may be assigned to more critical customers. Alternately, the better performing agents may be rated higher in job performance review. Additionally, the performance areas may be analyzed to identify areas of expertise of the agents or areas where an agent may require improvement (i.e., whether the agent requires any training sessions to further improve their skillset and add value to the organization).

It should be noted that all such aforementioned engines 204-207 may be represented as a single module or a combination of different modules. Further, as will be appreciated by those skilled in the art, each of the engines 204-207 may reside, in whole or in parts, on one device or multiple devices in communication with each other. In some embodiments, each of the engines 204-207 may be implemented as dedicated hardware circuit comprising custom application-specific integrated circuit (ASIC) or gate arrays, off-the-shelf semiconductors such as logic chips, transistors, or other discrete components. Each of the engines 204-207 may also be implemented in a programmable hardware device such as a field programmable gate array (FPGA), programmable array logic, programmable logic device, and so forth. Alternatively, each of the engines 204-207 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for determination of personality traits of agents in a contact center. For example, the exemplary server 101 may determine personality traits of agents in a contact center by the processes discussed herein. In particular, as will be appreciated by those of ordinary skill in the art, control logic and/or automated routines for performing the techniques and steps described herein may be implemented by the server 101 either by hardware, software, or combinations of hardware and software. For example, suitable code may be accessed and executed by the one or more processors on the server 101 to perform some or all of the techniques described herein. Similarly, application specific integrated circuits (ASICs) configured to perform some or all of the processes described herein may be included in the one or more processors on the server 101.

Figure 3:
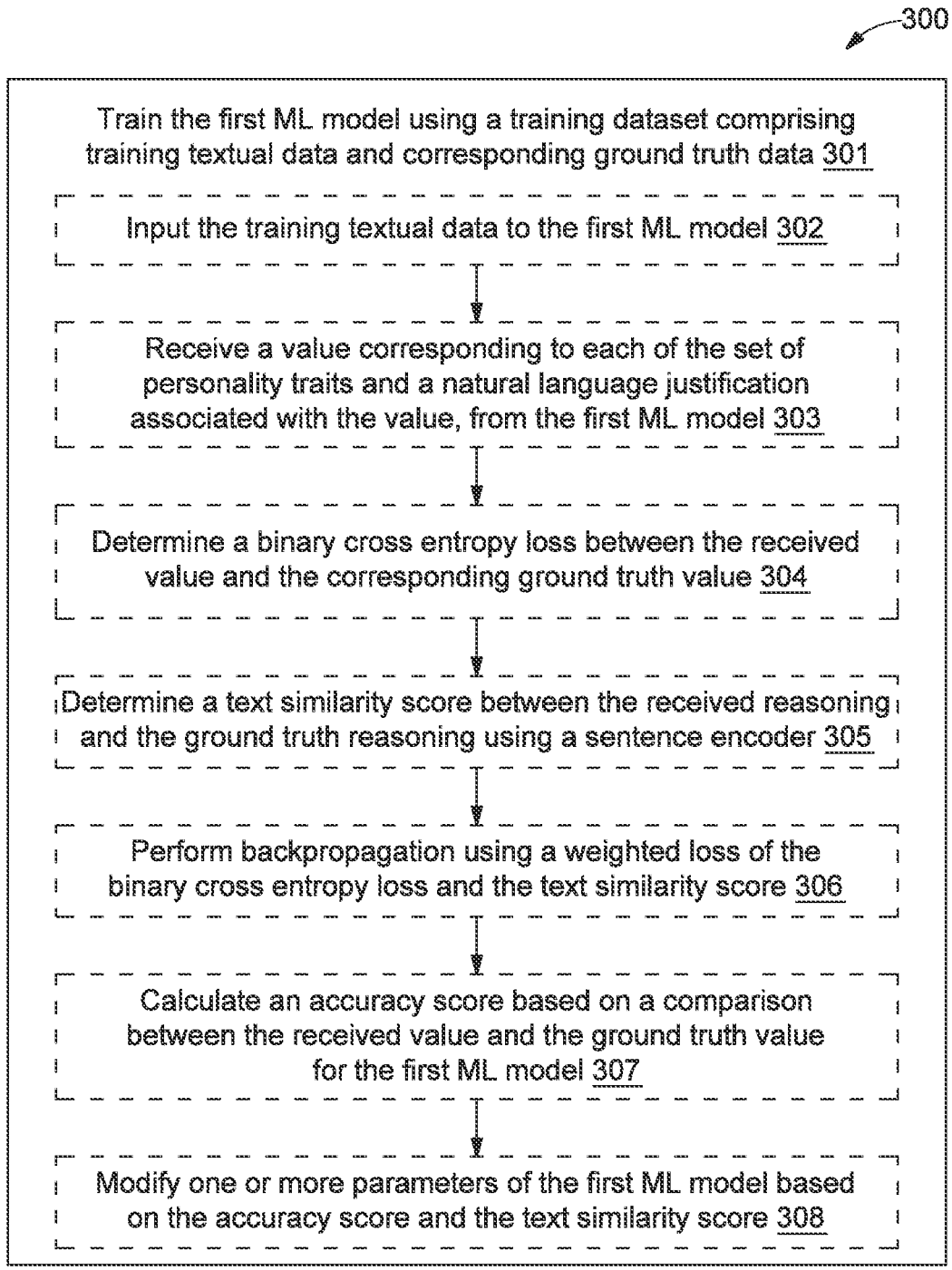
FIG. 3 is a flow diagram of an exemplary process for training a first Machine Learning (ML) model, in accordance with an exemplary embodiment of the present disclosure.

FIG. 3 is a diagram that illustrates an exemplary process 300 for training a first ML model, in accordance with an exemplary embodiment of the present disclosure. FIG. 3 is explained in conjunction with elements from FIGS. 1 and 2. In an embodiment, the process 300 may be implemented by the server 101. The process 300 may include training, by the ML engine 204, the first ML model using a training dataset such as the training dataset 209) including training textual data and corresponding ground truth data, at step 301. Each element of the ground truth data includes a ground truth value and an associated ground truth reasoning for each of the set of personality traits.

Further, to train the first ML model, the process 300 may include inputting, by the ML engine 204, the training textual data to the first ML model, at step 302. Further, to train the first ML model, the process 300 may include receiving, by the ML engine 204, a value corresponding to each of the set of personality traits and a natural language justification associated with the value, from the first ML model, at step 303. Further, to train the first ML model, the process 300 may include determining, by the ML engine 204, a binary cross entropy loss between the received value and the corresponding ground truth value, at step 304. Further, to train the first ML model, the process 300 may include determining, by the ML engine 204, a text similarity score between the received natural language justification and the ground truth reasoning using a sentence encoder, at step 305.

Further, to train the first ML model, the process 300 may include performing, by the ML engine 204, backpropagation using a weighted loss of the binary cross entropy loss and the text similarity score, at step 306. Further, to train the first ML model, the process 300 may include calculating, by the ML engine 204, an accuracy score (e.g., an F1 score) between the received value and the ground truth value for the first ML model, at step 307. Further, to train the first ML model, the process 300 may include modifying, by the ML engine 204, one or more parameters of the first ML model based on the accuracy score, the text similarity score, and the backpropagation, at step 308.

Figure 4:
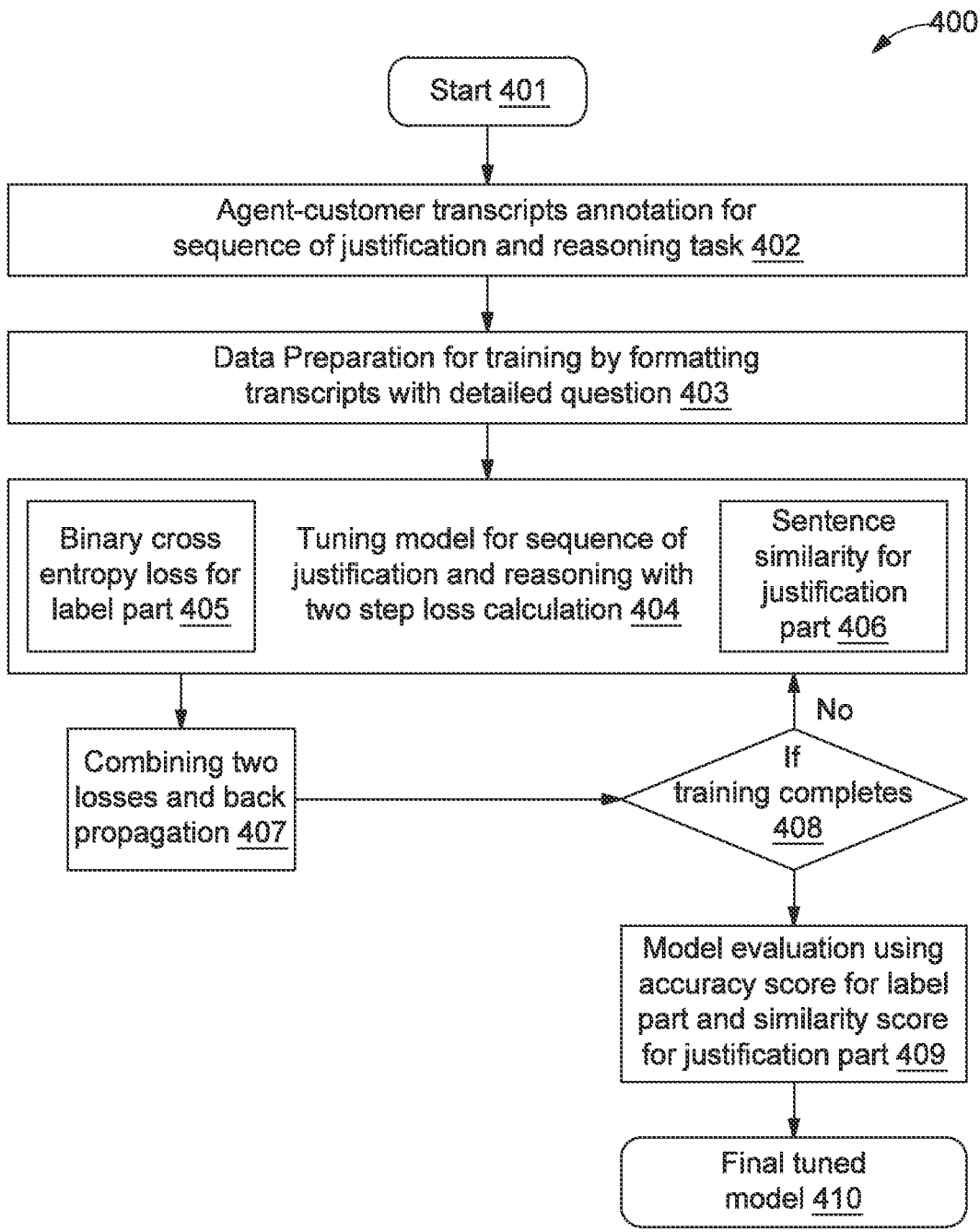
FIG. 4 is a flow diagram of a detailed exemplary control logic for training a first MIL model, in accordance with an exemplary embodiment of the present disclosure.

FIG. 4 is a flow diagram that illustrates a detailed exemplary control logic 400 for training the first ML model, in accordance with an exemplary embodiment of the present disclosure. FIG. 4 is explained in conjunction with elements from FIGS. 1, 2, and 3. In an embodiment, the control logic 400 may be implemented by the server 101. At step 401, the control logic 400 may be started. Further, the control logic 400 may include receiving, by the first ML model, agent-customer transcripts (i.e., the training textual data) annotation for sequence of justification and reasoning task, at step 402. It should be noted that the "sequence of justification and reasoning task" implies generation of the natural language justification by the first ML model. Using entire transcript as input would mean that the first ML model (such as a sequence of justification and reasoning model) will holistically consider the interaction between customer and agent. An exemplary agent-customer transcript is given below.

"[customer:] loyalty department[a:script] got it! first learn what to expect when you cancel directv.still want to cancel? yesno[customer:] no[a:script] have another question? ask away! [customer:] loyal promotion[a:script] got it. please tell us your first name. [customer:] esequiel[a:script] thank you. please wait as you are assigned to the next available specialist for account support. [agent:] thank you for contacting at&t my name is john and i'll be happy to help you today. [agent:] please allow me a moment to read back the interaction. [agent:] hi esequiel. i understand that you need to contact our loyalty department. they're not available on the chat support we do. [agent:] just checking to see if you are there so we can continue. [agent:] please let me know if you're receiving my responses."

Further, the control logic 400 may include preparing data for training by formatting transcripts with detailed question, at step 403. Data preparation (or preprocessing) is done using tokenizer, which converts input and output textual data into tokens and attention mask. Data preparation for training may include adding a detailed question (i.e., a prompt) along with the transcript. The prompt may be in form of a label or a question. The agent-customer transcript is used as an input for the first ML model. Each training data element is formatted as detailed question along with the agent-customer transcript. It should be noted that formatting the input agent-customer transcript along with the detailed question (e.g., "what traits does the agent show from emotional stability, critical thinking, empathy or friendliness, effective communication skills, and knowledge retention?"), helps the first ML model in step-by-step learning. In the first ML model, output may be decoded using a "best optimal path" decoding approach, which improves the generation of natural language justification (i.e., reasoning). The training dataset prompts the first ML model to provide multistep justification to explain the determined value (i.e., label) corresponding to each of the set of personality traits. The multistep justification may or may not be in a form of a conversational text. Additionally, the multistep justification may be a combined reasoning for the determined values corresponding to the entire set of personality traits. The first ML model may then generate a natural language justification based on the input agent-customer transcript and the detailed question. In continuation of the example above, the natural language justification generated by the first ML model for the exemplary transcript may be as follows.

"Customer service is shown in the phrase 'I'll be happy to help you today'. Customer service is a sub-trait of 'personality'. So the agent shows personality. This transcript does not show evidence of emotional stability. This transcript does not show evidence of critical thinking. This transcript does not show evidence of empathy. This transcript does not show evidence of effective communication skills. Information recall is shown in the phrase 'I understand that you need to contact our loyalty department'. Information recall is a sub-trait of the trait 'knowledge retention'. So the agent shows knowledge retention."

Additionally, the sequence of justification and reasoning model may predict a label (i.e., a value) for each of a set of personality traits (such as, good personality (GP), emotional stability (ES), critical thinking (CT), empathy (E), effective communication skills (ECS), and knowledge retention (KR)) using the natural language justification as a prompt. In continuation of the example above, the labels and their corresponding values may be as follows:

[(GP:1), (ES:0), (CT:0), (E:0), (ECS:0), (KR:1)]

The label may be positive (assigned value will be 1 in the above example) or negative (assigned value will be 0 in the above example). An example of a sequence of justification for a positive label may be as follows:

"Good attitude, customer service and positivity are shown in the phrase 'you're very welcome!'. Good attitude, customer service and positivity are sub-traits of the trait 'good personality'. So the agent shows good personality."

An example of a sequence of justification for a negative label may be as follows.

"This transcript does not show evidence of good personality."

Further, the control logic 400 may include tuning the first ML model for sequence of justification and reasoning with two step loss calculation, at step 404. The two-step loss calculation may include generating a binary cross entropy loss for determined labels 405 and a sentence similarity for generated natural language justification 406. The ML engine 204 may determine the binary cross entropy loss 405 between the determined labels and ground truth labels (i.e., labels provided in the training dataset). Further, the server 101 may determine the sentence similarity 806 between the generated natural language justification and the ground truth reasoning using a sentence encoder.

Further, the control logic 400 may include combining two losses and back propagation, at step 407. For backpropagation, the two loss values (i.e., the binary cross entropy loss 405 and the sentence similarity 406) may or may not be combined as a weighted average to obtain a combined loss value (for example, a weighted loss if the weighted average is computed).

Further, at step 408 of the control logic 400, a check may be performed to determine whether training is completed. If the training is competed, the control logic 400 may include model evaluation using an accuracy score (e.g., an F1 score) for label part and similarity score for justification part, at step 409. Further, the control logic 400 may output a final tuned model, at step 410. If the training is not completed at step 408, the control logic 400 may include performing the step 404 iteratively until the training is determined to be complete (i.e., predefined threshold values of the accuracy score and the text similarity score are achieved) based on the backpropagation.

Figure 5:
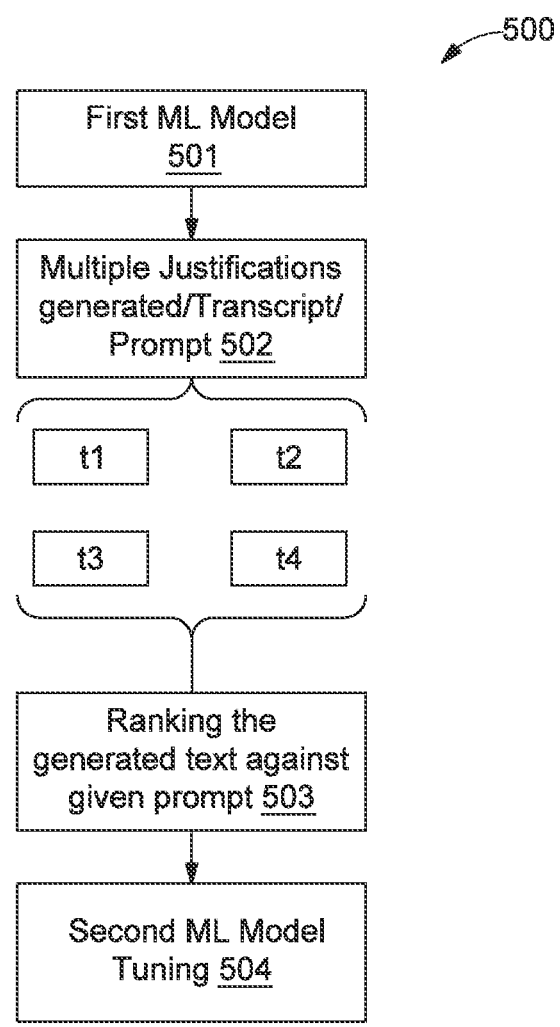
FIG. 5 is a flow diagram of a detailed exemplary control logic for tuning a second ML model, in accordance with an exemplary embodiment of the present disclosure.

FIG. 5 is a flow diagram that illustrates a detailed exemplary control logic 500 for tuning the second ML model, in accordance with an exemplary embodiment of the present disclosure. FIG. 5 is explained in conjunction with elements from FIGS. 1, 2, 3, and 4. In an embodiment, the control logic 500 may be implemented by the server 101. The control logic 500 may include generating, by a first ML model 501 (same as the first ML model of the ML engine 204), multiple natural language justifications for input data (i.e., transcript and prompt), at step 502. By way of an example, the multiple natural language justifications may include a natural language justification t1, a natural language justification t2, a natural language justification t3, and a natural language justification t4. It may be noted that the number of natural language justifications generated by the first ML model 501 may be a pre-configured number. In some embodiments, more than 4 natural language justifications may be generated by the first ML model 501.

Further, the control logic 500 may include ranking, by the second ML model, the generated natural language justifications against a given prompt, at step 503. The second ML model may be based on an AI model. The second ML model may be tuned by taking transcript and the generated multiple natural language justifications as a pair and then, making the second ML model to rank each of the multiple natural language justifications. In continuation of the example above, the natural language justification t4 may be assigned a rank 1, the natural language justification t2 may be assigned a rank 2, the natural language justification t1 may be assigned a rank 3, and the natural language justification t3 may be assigned a rank 4.

Further, the control logic 500 may include tuning the second ML model, at step 504. Tuning may include modification of one or more parameters of the second ML model based on the assigned rank. In other words, the second ML model may be updated by the ML engine 204 based on the assigned rank in the step 503. The second ML model may select the highest ranked natural language justification as an output for the first ML model 501. Thus, the second ML model may be tuned to identify the best natural language justification from the multiple natural language justifications. In continuation of the example above, the natural language justification t4 may be selected as the output justification of the first ML model 501. The second ML model may reward (by, for example, assigning higher ranks or scores) natural language justifications in accordance with prompting data provided in the training dataset. The generated natural language justifications that are better aligned with the natural language justifications provided in the prompting data are ranked higher by the second ML model.

In some embodiments, the final output natural language justification may be a combination of selected elements from each of the generated multiple natural language justifications. For example, when the first ML model 501 generates 4 natural language justifications—the natural language justification t4 (ranked 1), the natural language justification t2 (ranked 2), the natural language justification t1 (ranked 3), and the natural language justification t3 (ranked 4)—the first ML model 501 may output a natural language justification t5 which may include selected elements from each of the 4 natural language justifications. Here, the highest ranked natural language justification may be assigned a higher weightage in determining the final output natural language justification. The first ML model 501 may then learn from each of the 4 natural language justifications in accordance with their assigned weightages. In this case, the final output natural language justification may be more aligned with, but not completely identical to, the highest ranked natural language justification.

Figure 6:
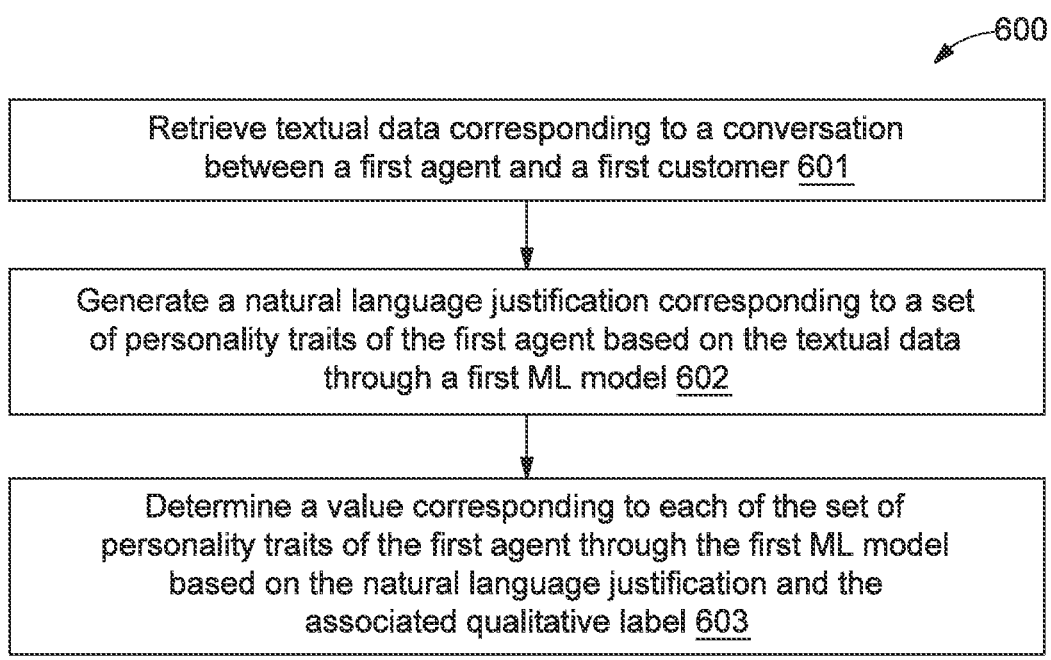
FIG. 6 is a flow diagram of an exemplary process for determination of personality traits of agents in a contact center, in accordance with an exemplary embodiment of the present disclosure.

FIG. 6 is a flow diagram that illustrates an exemplary process 600 for determination of agent personality traits in a contact center, in accordance with an exemplary embodiment of the present disclosure. FIG. 6 is explained in conjunction with elements from FIGS. 1, 2, 3, 4, and 5. In an embodiment, the process 600 may be implemented by the server 101. The process 600 may include retrieving, by the ML engine 204 and via the processing circuitry 201, textual data corresponding to a conversation between a first agent and a first customer, at step 601. The textual data may include a transcript of the conversation.

Further, the process 600 may include generating, by the server, a natural language justification corresponding to a set of personality traits of the first agent based on the textual data through a first ML model (such as the first ML model 501), at step 602. The natural language justification may include one or more sentences. The one or more sentences may include a mapping of the textual data with the set of personality traits and a qualitative label associated with each of the set of personality traits. By way of an example, the set of personality traits may include at least one of emotional stability, critical thinking, empathy, communication skills, knowledge retention, organization, speed and accuracy score, team player score, and adaptability.

Further, the process 600 may include determining, by the server, a value corresponding to each of the set of personality traits of the first agent through the first ML model based on the natural language justification and the associated qualitative label, at step 603.

In some embodiments, the process 600 may include rendering a GUI on a display of a user device. Further, the process 600 may include presenting the generated natural language justification and the determined value corresponding to each of the set of personality traits on the GUI.

Figure 7:
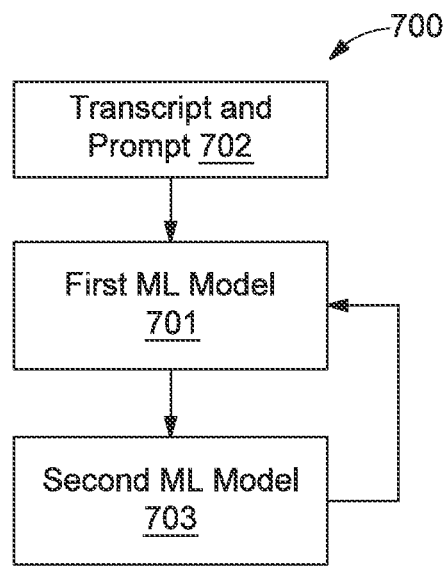
FIG. 7 is a diagram of a rewarding mechanism of a tuned first ML model, in accordance an exemplary embodiment of the present disclosure.

FIG. 7 is a diagram that illustrates rewarding mechanism of a first ML model 701, in accordance with an exemplary embodiment of the present disclosure. FIG. 7 is explained in conjunction with elements from FIGS. 1, 2, 3, 4, 5, and 6. The first ML model 701 (same as the first model 501) may receive a transcript and prompt 702 corresponding to conversations between an agent and a plurality of customers. It should be noted that the transcript and prompt 702 may be the same as the textual data 208. Further, the first ML model 701 may generate a set of natural language justifications. The set of natural language justifications may be received by a second ML model 703. It may be noted that the second ML model 703 is the same as the second ML model of the ML engine 204.

Further, the second ML model 703 may assign a rank to each of the set of natural language justifications. Further, the second ML model 703 may determine a reward for each of the set of natural language justifications based on the assigned rank. In an embodiment, the reward may be in form of a score corresponding to each of the set of natural language justifications. The reward may be used to implement a reinforcement learning technique to further tune the first ML model 701 (i.e., modify one or more parameters of the first ML model 701).

Figure 8:
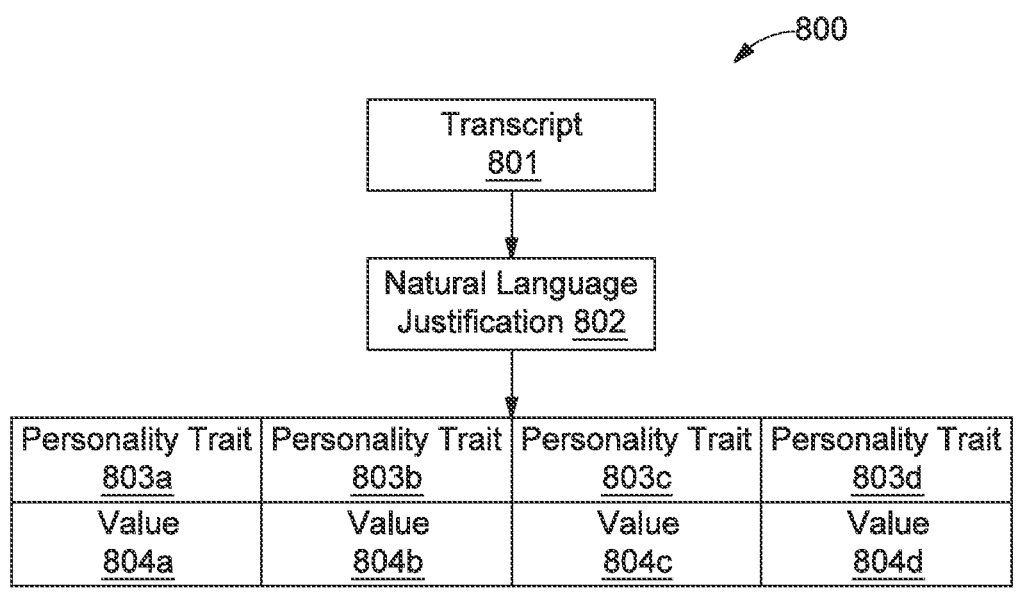
FIG. 8 is a diagram of generation of a value corresponding to each of a set of personality traits of an agent, in accordance with an exemplary embodiment of the present disclosure.

FIG. 8 is a diagram that illustrates generation of a value corresponding to each of a set of personality traits of an agent, in accordance with an exemplary embodiment of the present disclosure. FIG. 8 is explained in conjunction with elements from FIGS. 1, 2, 3, 4, 5, 6, and 7. An ML model (such as, the first ML model) that can generate natural language justification upon analyzing a transcript 801 may be used to generate the value corresponding to each of the set of personality traits of the agent. First, the first ML model may receive the transcript 801.

By way of an example, the transcript 801 received by the first ML model may be as given below.

"[customer:] i have an issue with my most recent bill. [agent:] ok lets get your bill question answered! what are you trying to do today? make or change a payment arrangement get info about a fee or charge on my bill find out how a plan change would affect my bill find out why my bill went up pay my bill get info about ##charges [customer:] i would like to chat with an actual person to resolve my issue. [agent:] let me get you to a specialist. please tell us your first name. [customer:] watson [agent:] thank you. you will now be connected to a specialist for account support. [agent:] thank you for contacting ##. my name is finn. im happy to help. [customer:] hi i noticed on my most recent billing statement that i was charge a $99 dispatch fee. [agent:] hello watson. i understand your concern. [agent:] let pull up your account and bill. [customer:] the issue was that the line was only buried about 1 inch below the top soil. my husband was doing yard work and the line had been previously patched in that spot (according to the technician who came to fix it) and the line was broke in that spot. [customer:] the technician said it was poorly patched a previous time it was not done right. he fixed it and did it well. [customer:] i was never told i would be charged for anything. [customer:] and now i see i was charged and my autopay already paid it [agent:] let me check that to whether any notes are there on your account from tech team. anyway no worries. [customer:] ok."

Further, the first ML model may generate a natural language justification 802 based on the transcript 801. In continuation of the example above, the natural language justification 802 generated by the first ML model may be as given below.

"The agent in this conversation shows emotional stability by remaining calm and professional throughout the conversation. In this, "Let me get you to a specialist. Please tell us your first name.", the agent shows critical thinking by taking action to connect the customer to a specialist who can better assist them. In this, "Hi Watson. I understand your concern.", the agent shows empathy and friendliness by acknowledging the customer's issue and expressing understanding. The agent doesn't show knowledge retention skills in this conversation."

Further, the first ML model may generate a value corresponding to each of the set of personality traits of the agent based on the natural language justification 802. In an embodiment, the set of personality traits and the corresponding values may be presented in a tabular format (as is shown in the figure). In other embodiments, the set of personality traits and the corresponding values may be presented through other graphical representations (such as, charts, lists, animated objects, etc.).

By way of an example, the personality trait 803a may be "emotional stability" and the corresponding value 804a may be "1". The personality trait 803b may be "critical thinking" and the corresponding value 804b may be "1". The personality trait 803c may be "empathy" and the corresponding value 804c may be "1". The personality trait 803d may be "knowledge retention" and the corresponding value 804d may be "0".

Figure 9:
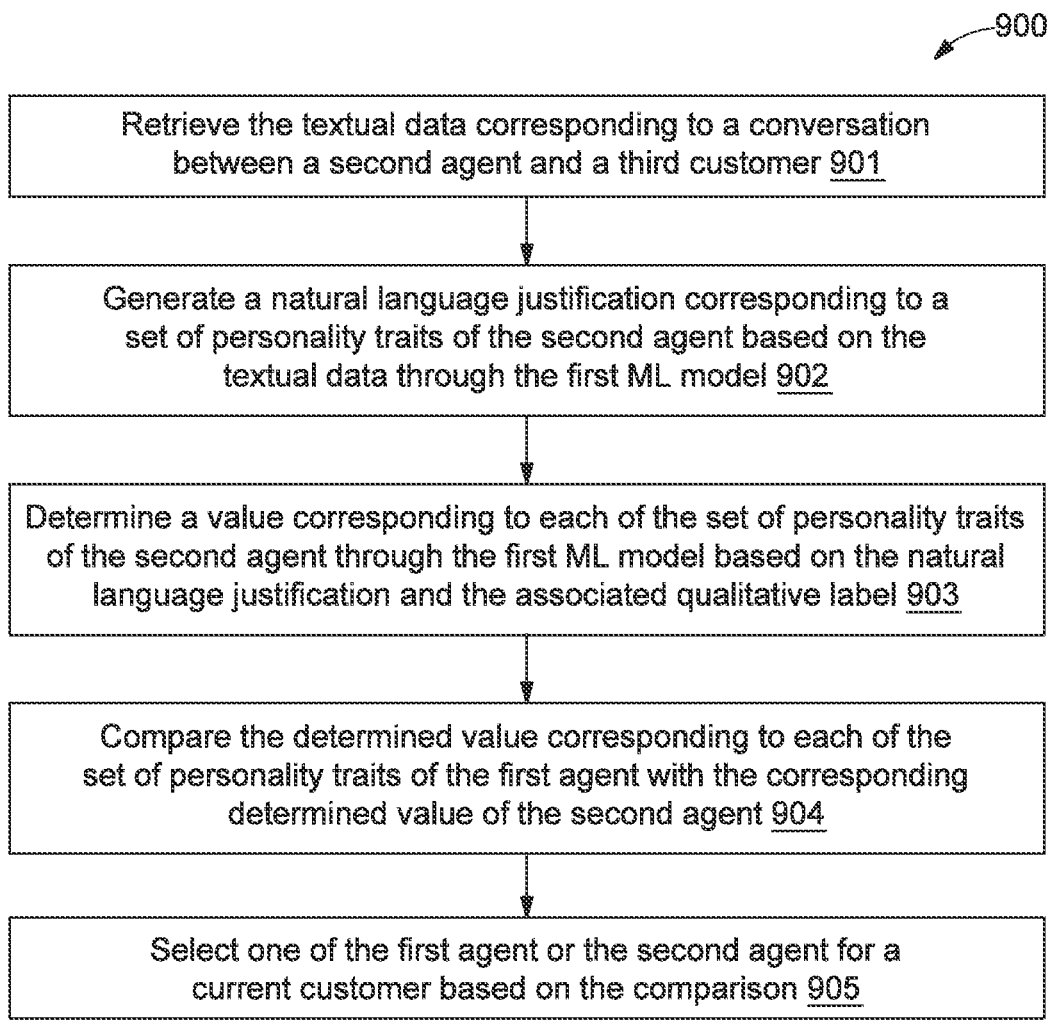
FIG. 9 is a flow diagram of an exemplary process for selection of an agent for interacting with a customer, in accordance with an exemplary embodiment of the present disclosure.

FIG. 9 is a flow diagram of an exemplary process 900 for selection of an agent for interacting with a customer, in accordance with an exemplary embodiment of the present disclosure. FIG. 9 is explained in conjunction with elements from FIGS. 1, 2, 3, 4, 5, 6, 7, and 8. In an embodiment, the process 900 may be implemented by the server 101. It should be noted that the process 900 may be in continuation of the process 600. In other words, upon determining the value corresponding to each of the set of personality traits of the first agent through the process 600, the server 101 may determine a value corresponding to a set of personality traits of the second agent through the process 900. The process 900 may include retrieving, by the ML engine 204, the textual data 208 corresponding to a conversation between a second agent and a third customer, at step 901. It may be noted that the second agent is not the same as the first agent. In most cases, the third customer may neither be the same as the first customer nor the second customer. However, in some scenarios, the third customer may be the same as one of the first customer or the second customer, implying that the first agent and the second agent have interacted with the same customer (at least once). Also, the textual data 208 may be obtained in a similar manner as explained for retrieving the textual data 208 corresponding to the conversation between the first agent and the first customer.

Further, the process 900 may include generating, by the ML engine 204, a natural language justification corresponding to a set of personality traits of the second agent based on the textual data through the first ML model, at step 902.

Further, the process 900 may include determining, by the personality scoring engine 206, a value corresponding to each of the set of personality traits of the second agent through the first ML model based on the natural language justification and the associated qualitative label, at step 903.

Further, the process 900 may include comparing, by the call routing engine 207, the determined value corresponding to each of the set of personality traits of the first agent with the corresponding determined value of the second agent, at step 904.

Further, the process 900 may include selecting, by the call routing engine 207, one of the first agent or the second agent to interact with a current customer based on the comparison, at step 905. It may be noted that the process 900 describes a selection of an agent from two agents for ease of explanation. However, the logic is in no way limiting to two agents. The same comparison logic may be applied to more than two agents for an intelligent routing process.

In some embodiments, a profile of the current customer may also be mapped and analyzed. The profile of the current customer may be derived from customer data derived from past interactions with one or more of the plurality of agents of the enterprise. Alternately, the customer data may be derived from third-party sources. A value corresponding to a set of personality traits of the customer may be determined by the first ML model using a natural language justification generated based on the customer data similar to the determination of the value of the set of personality traits of the agents.

FIG. 10 is a block diagram that illustrates a GUI 1000 for determination of personality traits of agents in a contact center, in accordance with an exemplary embodiment of the present disclosure. FIG. 10 is explained in conjunction with elements from FIGS. 1, 2, 3, 4, 5, 6, 7, 8, and 9. The server 101 may render the generated natural language justification and the determined value corresponding to each of the set of personality traits on the GUI 1000. The GUI 1000 may include input GUI elements and output GUI elements. In an embodiment, the input GUI elements may correspond to a transcript 1001 and a maximum length 1002. The output GUI elements may correspond to a section for analysis 1003. By way of an example, the section for analysis 1003 may further include sections for rendering predicted labels 1004 and reasoning 1005.

A user may enter the transcript 1001 as a string and may provide the maximum length 1002 as an integer. Upon providing the required input, the user may hit a "submit" button. For a first exemplary input transcript and the maximum length of "1024", the section for analysis provides the corresponding outputs for predicted labels and reasoning as follows.

Predicted labels: ['good personality', ' ', 'critical thinking', ' ', 'effective communication skills', 'knowledge retention']

Reasoning:" . . . . Because: Positivity and good attitude are shown in the phrase "I would like to assist you regarding this since have not received any response from you". Positivity and good attitude are subtracts of the trait "good personality". So the agent shows good personality. This transcript does not show evidence of emotional stability. This transcript does not show evidence of critical thinking. This transcript does not show evidence of empathy. This transcript does not show evidence of effective communication skills. This transcript does not show evidence of knowledge retention."

Similarly, for a second exemplary input transcript and the maximum length of "1024", the section for analysis provides the corresponding outputs for predicted labels and reasoning as follows.

Predicted labels: [good personality, ", critical thinking, ", effective communication skills, "]

Reasoning:" . . . . Because Positivity and good attitude are shown in the phrase "I would be more than happy to assist you with upgrading your device". Positivity and good attitude are subtracts of the trait "good personality": So the agent shows good personality. This transcript does not show evidence of emotional stability. This transcript does not show evidence of critical thinking. This transcript does not show evidence of empathy This transcript does not show evidence of effective communication skills. This transcript does not show evidence of knowledge retention."

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
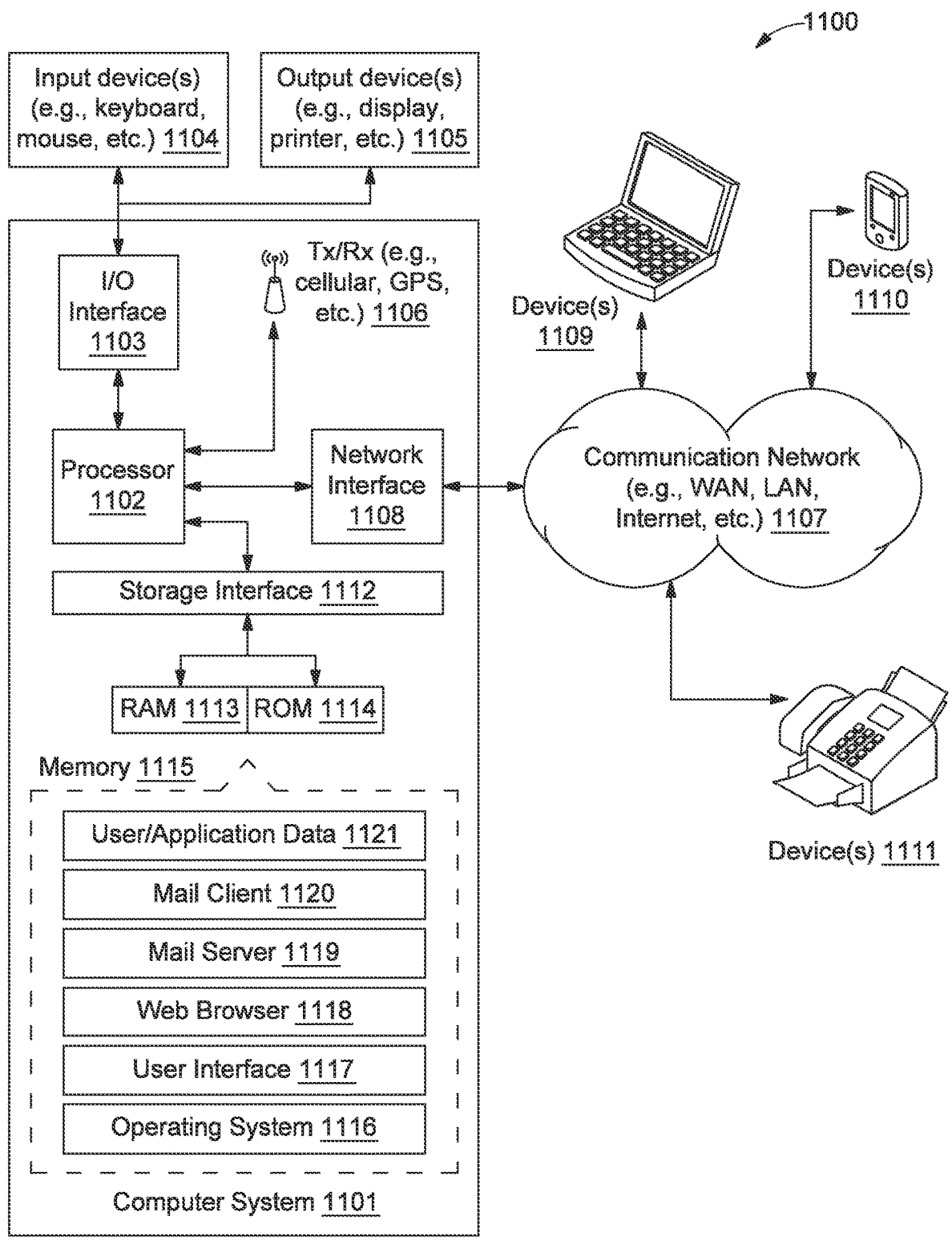
FIG. 11 is a block diagram that illustrates a system architecture of a computer system for determination of personality traits of agents in a contact center, in accordance with an exemplary embodiment of the present disclosure.

The disclosed methods and systems may be implemented on a conventional or a general-purpose computer system, such as a personal computer (PC) or server computer. FIG. 11 is a block diagram that illustrates a system architecture 1100 of a computer system 1101 for determination of personality traits of agents in a contact center, in accordance with an exemplary embodiment of the present disclosure. Variations of computer system 1101 may be used for implementing server 101 for determination of personality traits of agents in a contact center. Computer system 1101 may include a central processing unit ("CPU" or "processor") 1102. Processor 1102 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interface

1103. The I/O interface 1103 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver 1106 may facilitate various types of wireless transmission or reception. For example, the transceiver 1106 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1107 via a network interface 1108. The network interface 1108 may communicate with the communication network 1107. The network interface 1108 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1107 may include, without limitation, a direct interconnection, local area network (LAN), wide area network (WAN), wireless network (e.g., using Wireless Application Protocol), the Internet, etc. Using the network interface 1108 and the communication network 1107, the computer system 1101 may communicate with devices 1105, 1109, 1110, and 1111. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 1101 may itself embody one or more of these devices.

In some embodiments, the processor 1102 may be disposed in communication with one or more memory devices 1115 (e.g., RAM 1113, ROM 1114, etc.) via a storage interface 1112. The storage interface 1112 may connect to memory devices 1115 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1115 may store a collection of program or database components, including, without limitation, an operating system 1116, user interface 1117, web browser 1118, mail server 1119, mail client 1120, user/application data 1121 (e.g., any data variables or data records discussed in this disclosure), etc. The operating system 1116 may facilitate resource management and operation of the computer system 1101. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT WINDOWS® (XP®, Vista®/7/8/10/11, etc.), APPLE® IOS®, GOOGLE® ANDROID®, BLACKBERRY® OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, APPLE MACINTOSH® operating systems' AQUA® platform, IBMR OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1101 may implement a web browser 1118 stored program component. The web browser 1118 may be a hypertext viewing application, such as MICROSOFT® INTERNET EXPLORER®, GOOGLE® CHROME®, MOZILLA FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1101 may implement a mail server 1119 stored program component. The mail server 1119 may be an Internet mail server such as MICROSOFT® EXCHANGE®, or the like. The mail server 1119 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 1119 may utilize communication protocols such as internet message access protocol (IMAP), messaging application programming interface (MAPI), MICROSOFT® EXCHANGER, post office protocol (POP), simple mail transfer protocol (SMTP), or the like. In some embodiments, the computer system 1101 may implement a mail client 1120 stored program component. The mail client 1120 may be a mail viewing application, such as APPLE MAIL®, MICROSOFT ENTOURAGE®, MICROSOFT OUTLOOK®, MOZILLA THUNDERBIRD®, etc.

In some embodiments, computer system 1101 may store user/application data 1121, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of determination of personality traits of agents in a contact center. Classical or traditional approaches for automating agent personality prediction struggle with multi-step reasoning involved to identify multiple intermediate series of justifications to conclude the best agent personality. The disclosed method and system receive textual data corresponding to interactions between the agent and a plurality of customers. Further, the method and system generate a natural language justification corresponding to the textual data through a first ML model. The first ML model generates the natural language justification via a second ML model using a reinforcement learning technique. Further, the method and system determine a value corresponding to each of a set of personality traits through the first ML model based on the natural language justification.

As will be appreciated by those skilled in the art, the techniques described in the various embodiments discussed above are not routine, or conventional, or well understood in the art. The techniques discussed above provide for determination of personality traits of agents in a contact center. The techniques decompose entire transcript into a sequence of explanations to conclude the agent personality. AI model is prompted to produce intermediate reasoning steps before giving the final answer. The idea is that a model-generated sequence of explanations would mimic a human-like intermediate thought process when working through a multi-step reasoning problem. The AI trained model generates a series of short sentences that mimic the reasoning process a person might employ in solving a task. The techniques further internally produce a stream of short sentence reasoning paths through the AI model out of which an optimal reasoning is auto selected and then, final output's semantic similarity is checked against the ground truth and finetuned further to reach the right answer.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for determination of personality traits of agents in a contact center. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for determination of personality traits of agents in a contact center, comprising:
retrieving, by a server, textual data corresponding to a conversation between a first agent and a first customer, wherein the textual data comprises a transcript of the conversation;
training, by the server, a first Machine Learning (ML) model using a training dataset that comprises training textual data and corresponding ground truth data, wherein each element of the ground truth data comprises a ground truth value and an associated ground truth reasoning for each of a set of personality traits of the first agent, and wherein the training of the first ML model comprises:
inputting, by the server, the training textual data to the first ML model;
receiving, by the server, a value corresponding to each of the set of personality traits and a natural language justification associated with the value, from the first ML model;
determining, by the server, a binary cross entropy loss between the received value and the corresponding ground truth value;
determining, by the server, a text similarity score between the received natural language justification and the ground truth reasoning using a sentence encoder;

performing, by the server, backpropagation using a weighted loss of the binary cross entropy loss and the text similarity score;

calculating, by the server, an accuracy score based on a comparison between the received value and the ground truth value for the first ML model; and modifying, by the server, one or more parameters of the first ML model based on the accuracy score, the text similarity score, and the backpropagation;

generating, by the server, a natural language justification corresponding to the set of personality traits of the first agent based on the textual data through the first ML model, wherein the natural language justification comprises one or more sentences, and wherein the one or more sentences comprise a mapping of the textual data with the set of personality traits and a qualitative label associated with each of the set of personality traits; and determining, by the server, a value corresponding to each of the set of personality traits of the first agent through the first ML model based on the natural language justification and the associated qualitative label.

2. The method of claim 1, further comprising:

generating, by the server, a set of natural language justifications corresponding to the textual data using the first ML model; and assigning, by the server, a rank to each of the set of natural language justifications using a second ML model.

3. The method of claim 2, further comprising determining, by the server, a score for each of the set of natural language justifications based on the rank, through the second ML model to select the natural language justification from the set of natural language justifications.

4. The method of claim 3, further comprising tuning, by the server, the second ML model to determine the score for each of the set of natural language justifications, wherein the tuning comprises:

modifying, by the server, one or more parameters of the second ML model based on the assigned rank.

5. The method of claim 1, wherein the set of personality traits comprises at least one of emotional stability, critical thinking, empathy, communication skills, knowledge retention, organization, speed and accuracy, team player skill, and adaptability.

6. The method of claim 1, further comprising:

rendering, by the server, a Graphical User Interface (GUI) on a display of a user device; and presenting, by the server, the generated natural language justification and the determined value corresponding to each of the set of personality traits on the GUI.

7. The method of claim 1, further comprising generating, by the server, the textual data from an audio recording of the conversation through a speech-to-text algorithm.

8. The method of claim 1, further comprising:

computing, by the server, a weighted average value of the value and a subsequently determined value for each of the set of personality traits through the first ML model, wherein the subsequently determined value is based on textual data of one of:

a conversation between the first agent and a second customer; or a subsequent conversation between the first agent and the first customer; and generating, by the server, an updated value for each of the set of personality traits, wherein the updated value is the weighted average value.

9. The method of claim 1, further comprising:

retrieving, by the server, the textual data corresponding to a conversation between a second agent and a third customer;

generating, by the server, a natural language justification corresponding to a set of personality traits of the second agent based on the textual data through the first ML model; and determining, by the server, a value corresponding to each of the set of personality traits of the second agent through the first ML model based on the natural language justification and the associated qualitative label.

10. The method of claim 9, further comprising:

comparing, by the server, the determined value corresponding to each of the set of personality traits of the first agent with the corresponding determined value of the second agent; and selecting, by the server, one of the first agent or the second agent to interact with a current customer based on the comparison.

11. A system for determination of personality traits of agents in a contact center, comprising:

a processing circuitry; and a memory communicatively coupled to the processing circuitry, wherein the memory stores processor instructions, which when executed by the processing circuitry, cause the processing circuitry to:

retrieve textual data corresponding to a conversation between a first agent and a first customer, wherein the textual data comprises a transcript of the conversation;

train a first Machine Learning (ML) model using a training dataset that comprises training textual data and corresponding ground truth data, wherein each element of the ground truth data comprises a ground truth value and an associated ground truth reasoning for each of a set of personality traits of the first agent, and wherein to train the first ML model, the processor instructions, on execution, cause the processing circuitry to:

input the training textual data to the first ML model;

receive a value corresponding to each of the set of personality traits and a natural language justification associated with the value, from the first ML model;

determine a binary cross entropy loss between the received value and the corresponding ground truth value;

determine a text similarity score between the received natural language justification and the ground truth reasoning using a sentence encoder;

perform backpropagation using a weighted loss of the binary cross entropy loss and the text similarity score;

calculate an accuracy score based on a comparison between the received value and the ground truth value for the first ML model; and modify one or more parameters of the first ML model based on the accuracy score, the text similarity score, and the backpropagation;

generate a natural language justification corresponding to the set of personality traits of the first agent based on the textual data through the first ML model, wherein the natural language justification comprises one or more sentences, and wherein the one or more sentences comprise a mapping of the textual data with the set of personality traits and a qualitative label associated with each of the set of personality traits; and determine a value corresponding to each of the set of personality traits of the first agent through the first ML model based on the natural language justification and the associated qualitative label.

12. The system of claim 11, wherein the processor instructions, on execution, further cause the processing circuitry to:

generate a set of natural language justifications corresponding to the textual data using the first ML model;

assign a rank to each of the set of natural language justifications using a second ML model; and determine a score for each of the set of natural language justifications based on the rank, through the second ML model to select the natural language justification from the set of natural language justifications.

13. The system of claim 12, wherein the processor instructions, on execution, further cause the processing circuitry to tune the second ML model to determine the score for each of the set of natural language justifications, wherein to tune the second ML model, the processor instructions, on execution, cause the processing circuitry to:

modify one or more parameters of the second ML model based on the assigned rank.

14. The system of claim 11, wherein the processor instructions, on execution, further cause the processing circuitry to:

render a Graphical User Interface (GUI) on a display of a user device; and present the generated natural language justification and the determined value corresponding to each of the set of personality traits on the GUI.

15. The system of claim 11, wherein the processor instructions, on execution, further cause the processing circuitry to generate the textual data from an audio recording of the conversation through a speech-to-text algorithm.

16. The system of claim 11, wherein the processor instructions, on execution, further cause the processing circuitry to:

compute a weighted average value of the value and a subsequently determined value for each of the set of personality traits through the first ML model, wherein the subsequently determined value is based on textual data of one of:

a conversation between the first agent and a second customer; or a subsequent conversation between the first agent and the first customer; and generate an updated value for each of the set of personality traits, wherein the updated value is the weighted average value.

17. The system of claim 11, wherein the processor instructions, on execution, further cause the processing circuitry to:

retrieve the textual data corresponding to a conversation between a second agent and a third customer;

generate a natural language justification corresponding to a set of personality traits of the second agent based on the textual data through the first ML model;

determine a value corresponding to each of the set of personality traits of the second agent through the first ML model based on the natural language justification and the associated qualitative label;

compare the determined value corresponding to each of the set of personality traits of the first agent with the corresponding determined value of the second agent; and select one of the first agent or the second agent to interact with a current customer based on the comparison.

* * * * *